(12) United States Patent
Le et al.

(10) Patent No.: US 11,900,062 B2
(45) Date of Patent: Feb. 13, 2024

(54) SYSTEMS AND METHODS FOR GENERATING DYNAMIC CONVERSATIONAL RESPONSES BASED ON PREDICTED USER INTENTS USING ARTIFICIAL INTELLIGENCE MODELS

(71) Applicant: Capital One Services, LLC, McLean, VA (US)

(72) Inventors: Minh Le, McLean, VA (US); Arturo Hernandez Zeledon, McLean, VA (US); Md Arafat Hossain Khan, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 305 days.

(21) Appl. No.: 17/492,078

(22) Filed: Oct. 1, 2021

(65) Prior Publication Data
US 2023/0107065 A1    Apr. 6, 2023

(51) Int. Cl.
*G06F 40/30* (2020.01)
*G06N 20/20* (2019.01)
*G06N 3/04* (2023.01)
*G06F 18/2137* (2023.01)

(52) U.S. Cl.
CPC ........ *G06F 40/30* (2020.01); *G06F 18/21375* (2023.01); *G06N 3/04* (2013.01); *G06N 20/20* (2019.01)

(58) Field of Classification Search
USPC .................................................... 704/1–504
See application file for complete search history.

(56) References Cited

U.S. PATENT DOCUMENTS

| | | | |
|---|---|---|---|
| 11,074,495 B2 * | 7/2021 | Zadeh | G06F 18/2413 |
| 2012/0253825 A1 | 10/2012 | Di Fabbrizio et al. | |
| 2013/0159220 A1 | 6/2013 | Winn et al. | |
| 2015/0058081 A1 | 2/2015 | Frank et al. | |
| 2017/0235740 A1 | 8/2017 | Seth et al. | |
| 2018/0052842 A1 * | 2/2018 | Hewavitharana | G06F 40/30 |
| 2018/0068031 A1 * | 3/2018 | Hewavitharana | G06F 9/30156 |
| 2018/0204111 A1 * | 7/2018 | Zadeh | G06V 10/764 |
| 2021/0209388 A1 * | 7/2021 | Ciftci | G06N 3/08 |
| 2022/0026920 A1 * | 1/2022 | Ebrahimi Afrouzi | G06N 3/045 |
| 2022/0121884 A1 * | 4/2022 | Zadeh | G06V 10/764 |
| 2023/0107065 A1 * | 4/2023 | Le | G06N 3/088 |
| | | | 704/9 |

FOREIGN PATENT DOCUMENTS

KR    10-2019-0109614 A    9/2019

OTHER PUBLICATIONS

International Search Report and Written Opinion issued in corresponding International application No. PCT/US2022/076771 dated Jan. 19, 2023 (10 pages).

* cited by examiner

*Primary Examiner* — Marcus T Riley
(74) *Attorney, Agent, or Firm* — Perkins Coie LLP (57) ABSTRACT

Described are methods and systems are for generating dynamic conversational queries. For example, as opposed to being a simply reactive system, the methods and systems herein provide means for actively determining a user's intent and generating a dynamic query based on the determined user intent. Moreover, these methods and systems generate these queries in a conversational environment.

20 Claims, 6 Drawing Sheets

SYSTEMS AND METHODS FOR GENERATING DYNAMIC CONVERSATIONAL RESPONSES BASED ON PREDICTED USER INTENTS USING ARTIFICIAL INTELLIGENCE MODELS

BACKGROUND

In recent years, the amount and uses of interactive programs has risen considerably. These interactive programs may generate and respond to user interactions in a user interface in order to engage in a conversational interaction with the user. The conversational interaction may include a back-and-forth exchange of ideas and information between the interactive program and the user.

SUMMARY

Methods and systems are described herein for generating dynamic conversational queries. For example, as opposed to being a simply reactive system, the methods and systems described herein provide means for actively determining a user's intent and generating a dynamic query based on the determined user intent. Moreover, the methods and systems generate these queries in a conversational environment. For example, conversational responses and/or queries include communications between a user and a system that may maintain a conversational tone, cadence, or speech pattern of a human during an interactive exchange between the user and the system. The interactive exchange may include the system generating queries to the user, responding to one or more user actions (which may include user inactions), and/or predicting responses prior to receiving a user action. In order to maintain the conversational interaction during the exchange, the system may advantageously generate responses that are both timely and pertinent (e.g., in a dynamic fashion). This requires the system to determine both quickly (i.e., in real-time or near real-time) and accurately the intent, goal, or motivation prior to receiving a user input (e.g., based on available user data). These user inputs or user data may take various forms including speech commands, textual inputs, responses to system queries, and/or other user actions (e.g., logging into a mobile application of the system). In each case, the system may aggregate information about a previous user action, information about the user, and/or other circumstances related to the user action (e.g., time of day, previous user actions, current account settings, etc.) in order to determine a likely intent of the user.

In order to determine the likely intent and generate a dynamic conversational response that is both timely and pertinent, the methods and systems herein use one or more machine learning models. For example, aggregated information about the user action, information about the user, and/or other circumstances related to the user action (e.g., time of day, previous user actions, current account settings, etc.) may be used to generate a feature input (e.g., a vector of data) that expresses the information quantitatively or qualitatively. An additional source of information may be based on electronic records. These electronic records may include records based on credit card monitoring, on-line bill paying, and on-line banking services.

As of yet, the use of this information provides numerous technical hurdles to conventional systems. For example, online services function through the use of payment systems that were not designed for today's near virtual world and use proprietary encoding methods, proprietary formats, and in many cases formats that are specific to a particular entity. As further background to this problem, online and electronic payment systems function through a network of interrelated components. These components exchange data to accept, authorize, clear, and settle transactions. A single transaction (and its corresponding transaction data) may include multiple systems interacting with each other and handling record data about a transaction that must be stored, transmitted, and verified in a secure and private manner. A single breakdown in the system may result in the private data being stolen or corrupted. In order to prevent a breakdown and increase efficiency, each system and/or component of a system may use its own (and, in many cases, proprietary) encoding and transmission formats. These systems are rigidly designed to increase the internal efficiency of the system and prevent errors in transmitting the data that may cause a transaction to be declined. Moreover, the systems were designed independently from each other without regard for centralized standards. Due to these features, aggregating transaction data across transactions is difficult as the different formats may cause each transaction to record transaction data in a different manner, use/require different types of transaction data, categorize its transaction data in different ways, and otherwise lack standardization across transactions.

Artificial intelligence, and its ability to identify patterns that may not otherwise be identifiable through manual means, offers potential in overcoming this problem. However, transaction data, as discussed above, is multi-modal and complex data, and transaction data structure contains many semantically dependent components. Moreover, transaction data available for modeling predictions for dynamic conversational response is extremely limited, and what data is available often have a high proportion of missing data points.

To further present a technical hurdle, the missing data points are mixed of both actual data errors and non-errors inferred from other components of the transaction data. For example a transaction may have a missing value (null) in the 'declineReason' data component. The interpretation of this missing value may be either an error in the data collection process, or an accepted transaction which has 'NoReason' value. Without adequate training data for prediction models, transaction data cannot be used to generate dynamic conversational responses with the desired accuracy.

To overcome these technical challenges, the methods and systems disclosed herein use a plurality of model components. For example, the model may use a combination of a Tabular AutoEncoder trained with mixed-type weighted loss function and a set of individual data components selected by predictive importance from eXtreme Gradient Boosting algorithm. For example, the system first attempts to determine how important a given transaction is to the intent of a user. For example, the system may use an autoencoder to create generic embedding representation of transaction data. The system then may use self-attention fine tuning on the embedding and a convolutional neural network to extract feature maps. These maps assign a probability weight to how important a transaction (e.g., corresponding to the transaction data) is to the intent of the user (i.e., the final output).

However, if the model has not yet seen data points (e.g., these data points represent "missing data"), the model cannot provide an adequate prediction. To overcome this technical problem, the system introduces a second set of data (e.g., passthrough transaction data). This second set of data is composed of components that are selected as the most important features using domain knowledge and eXtreme gradient boosting feature importance estimations.

The system then combines outputs from the first model and the second model thus combining the feature maps indicating transactions with likelihood of affecting intent and passthrough predictions indicating likely intents. The system then uses the output from the combined models to generate a prediction. Using this architecture, the system generates dynamic conversational responses based on predicted user intents using artificial intelligence models that compensate for training data featuring a high proportion of missing data points.

In some aspects, methods and systems are disclosed for generating dynamic conversational responses based on predicted user intents using artificial intelligence models. For example, the system may receive first user record data. The system may input the first user record data into an artificial intelligence model, wherein the artificial intelligence model comprises a neural network that is trained to predict user intent based on a first feature input and a second feature input, wherein the first feature input is based on an embedding of a first collection of user record data for a plurality of users and for a plurality of domains, and wherein the second feature input is based on a subset of the first collection comprising a group of domains selected from the plurality of domains. The system may receive an output from the artificial intelligence model. The system may generate for display, in a user interface, a dynamic conversational response based on the output.

Various other aspects, features, and advantages of the invention will be apparent through the detailed description of the invention and the drawings attached hereto. It is also to be understood that both the foregoing general description and the following detailed description are examples, and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

Figure 1:
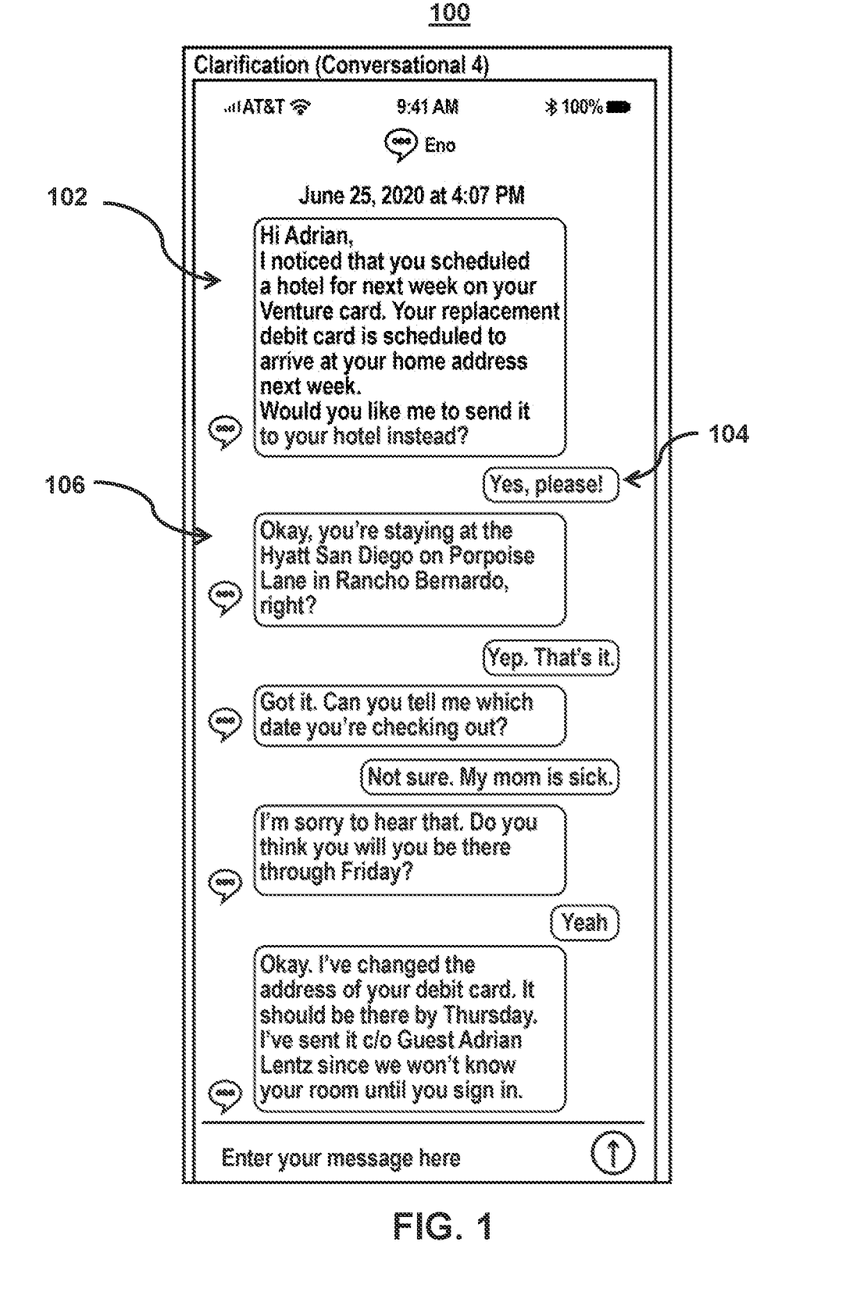
FIG. 1 shows an illustrative user interface for presenting dynamic conversational queries and responses, in accordance with one or more embodiments.

FIG. 1 shows an illustrative user interface for presenting dynamic conversational queries and responses, in accordance with one or more embodiments. For example, FIG. 1 shows user interface 100. The system (e.g., a mobile application) may generate and respond to user interactions in a user interface (e.g., user interface 100) in order to engage in a conversational interaction with the user. The conversational interaction may include a back-and-forth exchange of ideas and information between the system and the user. The conversational interaction may proceed through one or more mediums (e.g., text, video, audio, etc.). The system may provide human-like interactions and/or create applications that mimic the tone, cadence, and speech patterns of humans. In order to fulfill user-interaction requirements, the system needs to be helpful and respond intelligently by providing relevant responses to user inputs, whether these inputs are received via text, audio, or video input. For example, the system may use one or more artificial intelligence models and/or state machines (including machine learning models, neural networks, etc.) referred to here collectively as "models."

In order to maintain the conversational interaction, the system may need to generate responses (e.g., conversational response) dynamically and/or in substantially real-time. For example, the system may generate responses within the normal cadence of a conversation. In some embodiments, the system may continually determine a likely intent of the user in order to generate responses (e.g., in the form of prompts, notifications, and/or other communications) to the user. It should be noted that a response may include any step or action (or inaction) taken by the system, including computer processes, which may or may not be perceivable to a user.

For example, in response to a user action, which in some embodiments may comprise a user logging onto an application that generates user interface 100. In response to a user logging on, the system may generate a query (e.g., query 102). In response to a user inputting a query (e.g., query 104) into user interface 100, the system may then generate a subsequent query (e.g., query 106). The system may continue to receive queries (and responses thereto) as well as generate responses and/or queries.

In order to maintain the dynamic nature of the queries and/or responses the system may use one or more models. These models may execute a series of steps that may generate content quickly and accurately to maintain a cadence of a normal conversation with a user. These steps may include retrieving data about the user, retrieving data from other sources, monitoring user actions, and/or other steps in order to generate a feature input (e.g., as discussed below). In some embodiments, the system may generate a plurality of responses.

In some embodiments, the feature input may include a vector of values that describes various data about a user, a transaction of the user, a user action, and/or a current or previous interaction with the user. For example, a feature is an individual measurable property or characteristic of a user, a user action, and/or a current or previous interaction with the user. For example, the feature input may comprise a column of data (e.g., an input set) that represents characteristics of user data which the system may use to select a conversation response. Alternatively or additionally, the system may include a feature input layer that receives the feature input and applies data normalization. The system may further select the information for inclusion in the feature input based on a predictive value. The information may be collected actively or passively by the system and compiled into a user profile.

In some embodiments, the user record data (e.g., a user action) may include conversation details, such as information about a current session, including a channel or platform, e.g., desktop web, iOS, mobile, a launch page (e.g., the webpage that the application was launched from), a time of launch, activities in a current or previous session before launching the application. The system may store this information, and all the data about a conversational interaction may be available in real-time via HTTP messages and/or through data streaming from one or more sources (e.g., via an API).

In some embodiments, the user record data (e.g., a user action) may include user account information such as types of accounts the user has, other accounts on file, such as bank accounts for payment, information associated with accounts, such as credit limit, current balance, due date, recent payments, or recent transactions. The system may obtain this data in real-time for model prediction through enterprise APIs.

In some embodiments, the user record data (e.g., a user action) may include insights about users, provided to the application (e.g., via an API) from one or more sources, such as a qualitative or quantitative representations (e.g., a percent) of a given activity (e.g., online spending) in a given time period (e.g., six months), upcoming actions (e.g., travel departure, pay day, leave and/or family event) for a user, information about third parties (e.g., merchants (ranked by the number of transactions) over the last year for the user), etc.

Figure 2:
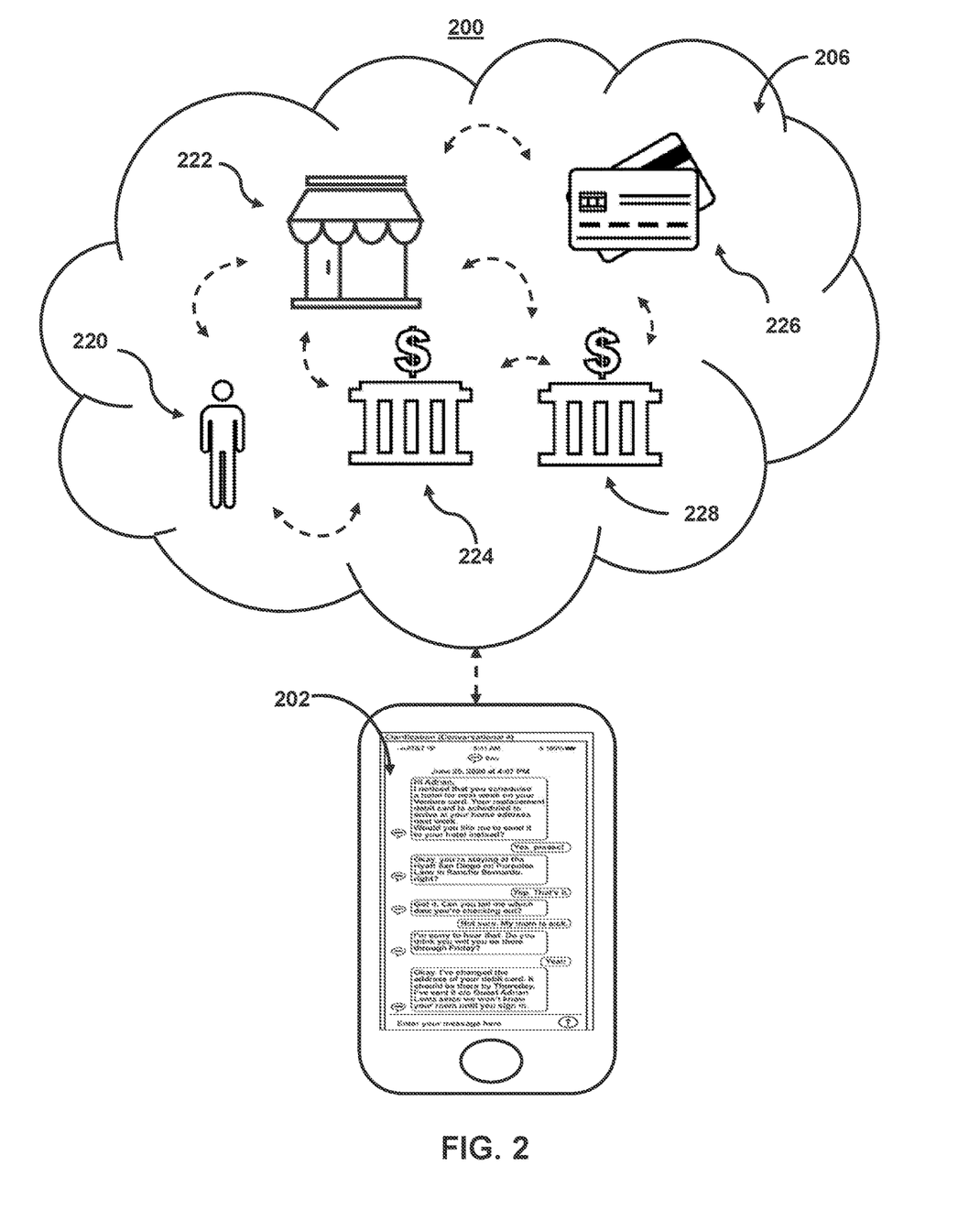
FIG. 2 shows an illustrative system for entities that may generate and/or effect user record data, in accordance with one or more embodiments.

FIG. 2 shows an illustrative system for entities that may generate and/or effect user record data, in accordance with one or more embodiments. FIG. 2 may illustrate a cloud environment featuring numerous entities and components, each of which may conduct transactions and pass information through one or more servers (referred collectively herein as server 206). Server 206 may include entities that generate user record data while processing user transactions. For example, the user record data may include data that the system has collected about the user through prior transactions.

As referred to herein, user record data may include any data related to a transaction. For example, the record data may include a paper or electronic record containing information about the transaction, such as transaction amount, transaction number, transaction date and time, transaction type (deposits, withdrawal, purchase or refund), type of account being debited or credited, card number, identity of the card acceptor (e.g., merchant/source, including source address, identification or serial number, and/or terminal (e.g., name from which the terminal operates)). For example, an exemplary record data for a transaction may include:
Transaction ID: 01234
Timestamp: 1/1/2020 01:30:55 AM UTC
Price: $57.98
Payment Currency: USD
Card Present: True
Merchant ID: 12345
Through the user of the application, the system may allow a user to transmit a transaction request using mobile device 202. In response to receiving the request, the entities (e.g., located at server 206) may process the request and initiate a transaction. Information about this transaction may be used to generate dynamic conversational responses (e.g., as described in FIG. 1) using the models described below.

For example, system 200 may involve multiple components and involve requests from one or more entities such as cardholder 220. For example, a given user may have multiple credit card accounts and thus correspond to a cardholder for multiple credit card networks. It should be noted that as referred to herein a credit card network may include debit cards, e-commerce accounts, source credit, and other electronic payment and/or monetary systems, such as online user currency accounts, cryptocurrencies, credit provider accounts, gift card accounts, etc.

System 200 may also include source 222, which may be associated with a store and/or vendor that sells goods and/or services to the cardholder. Source 222, which may be a merchant, may accept credit card payments. Source 222 may also send card and/or user account information to, and request payment authorization from, an issuing bank of cardholder 220. Source 222 may be assigned information by a network upon registration. That information may include a merchant/source ID, a network name, and an address. The network may further generate a cleansed network name based on a native network name (e.g., a network name based on a proprietary and/or non-public algorithm for generating a network name based on available data of a merchant when the merchant registers with the network).

For example, as part of a request, an exemplary source record for a network may include:
Merchant ID: 12345
Network Name: Josh's Board Game Store
Address: 1234 Main St. City, State 12346
Source 222 may include an acquiring bank 224, which may also comprise an acquiring processor or service provider. For example, the acquiring bank may receive payment authorization requests from source 222 and send them to issuing bank 228 (which may include, or be a separate entity from, acquiring bank 224). The acquiring bank 224 may then relay a response from issuing bank 228 to source 222. In some embodiments, acquiring bank 224 may be a third-party entity. Acquiring bank 224 may provide a service or device that allows source 222 to accept credit cards as well as send credit card payment details to network 226. Upon receipt, network 226 may forward the payment authorization back to acquiring bank 224.

Network 226 may include entities that operate credit card networks that process credit card payments worldwide and govern interchange fees. In some embodiments, issuing bank 128 may form part of network 226. For example, issuing bank 228 may be a financial institution that issued the credit card involved in the transaction. Issuing bank 228 may receive the payment authorization request from the credit card network and either approve or decline the transaction.

During processing, the components of system 200 may use multiple naming conventions, format, and value types of a category, value, etc. and these may differ. Additionally, the resulting user record data for each transaction may differ and may include missing data points. For example, one transaction may include a data described in a different naming convention (e.g., "Timestamp" below), errors in data (e.g., "DeclineReason" below), and missing data points (e.g., "Network name" below).

| | |
|---|---|
| Merchant ID: ABC456 | Merchant ID: CAC459 |
| DeclineReason: ERROR | Decline Reason: <null> |
| Network name: Josh's Board Game Store | Network name: <null> |
| Timestamp: Aug. 1, 2021 01:30:55 | Timestamp: Aug. 1, 2021 01:30:55 AM UTC |
| Price: $57.98 | Price: $57.98 |
| Network: Mastercard ™ | Network: Visa ™ |

In some embodiments, system 200 may compare data between system components during a transaction and/or aggregation of record data. For example, credit card transactions are processed through a variety of platforms, including brick-and-mortar stores, e-commerce stores, wireless terminals, and phone or mobile devices. The entire authorization cycle takes within two to three seconds, and the transaction process includes three stages of authorization, clearing, and settlement, in which clearing and settlement may take place simultaneously. In an authorization stage, source 222 must obtain approval for payment from issuing bank 228. Source 222 may transmit record data that may include: a credit card number, card expiration date, billing address (e.g., for address verification system ("AVS")), a validation card security code ("CVV"), and/or a payment amount.

As the transaction moves through system 200, issuing bank 228 may receive the payment authorization request from network 226. Issuing bank 228 validates the credit card number, checks the amount of available funds, matches the billing address to the one on file and validates the CVV number. Issuing bank 228 approves, or declines, the transaction and sends back an appropriate response to source 222 through system 200 (e.g., via network 226 and/or acquiring bank 224). Source 222 may receive the authorization, and issuing bank 228 may place a hold in the amount of the purchase on the account of cardholder 220.

During the clearing stage, the transaction is posted to both a credit card account of cardholder 220 and source 222. Source 222 then sends the approved authorizations in a batch to acquiring bank 224. Acquiring bank 224 then routes the batched information to network 226 for settlement. Network 226 forwards each approved transaction to an appropriate issuing bank 228. Issuing bank 228 will transfer the funds and may withhold exchange fees. Network 226 may also pay acquiring bank 224 a fee. Issue bank 228 may then post the user record data to an account of cardholder 220.

Thus, a single transaction includes multiple systems each interacting with each other and handling user data that must be stored, transmitted, and verified in a precise manner. In order to ensure precision, each system and/or component of a system may use its own (and in many cases proprietary) encoding mechanisms. Additionally, or alternatively, source 222, assigning bank 224, network 226, and/or issuing bank 228 each transmit a network name (e.g., an identification system used by an assigning party to indicate a source (e.g., source 222) corresponding to a transaction. However, as each system may use a private (and likely proprietary) algorithm for facilitating transactions, a network name generated and used by one component (e.g., network 226) may not be the same as the network name used by another network.

Figure 3:
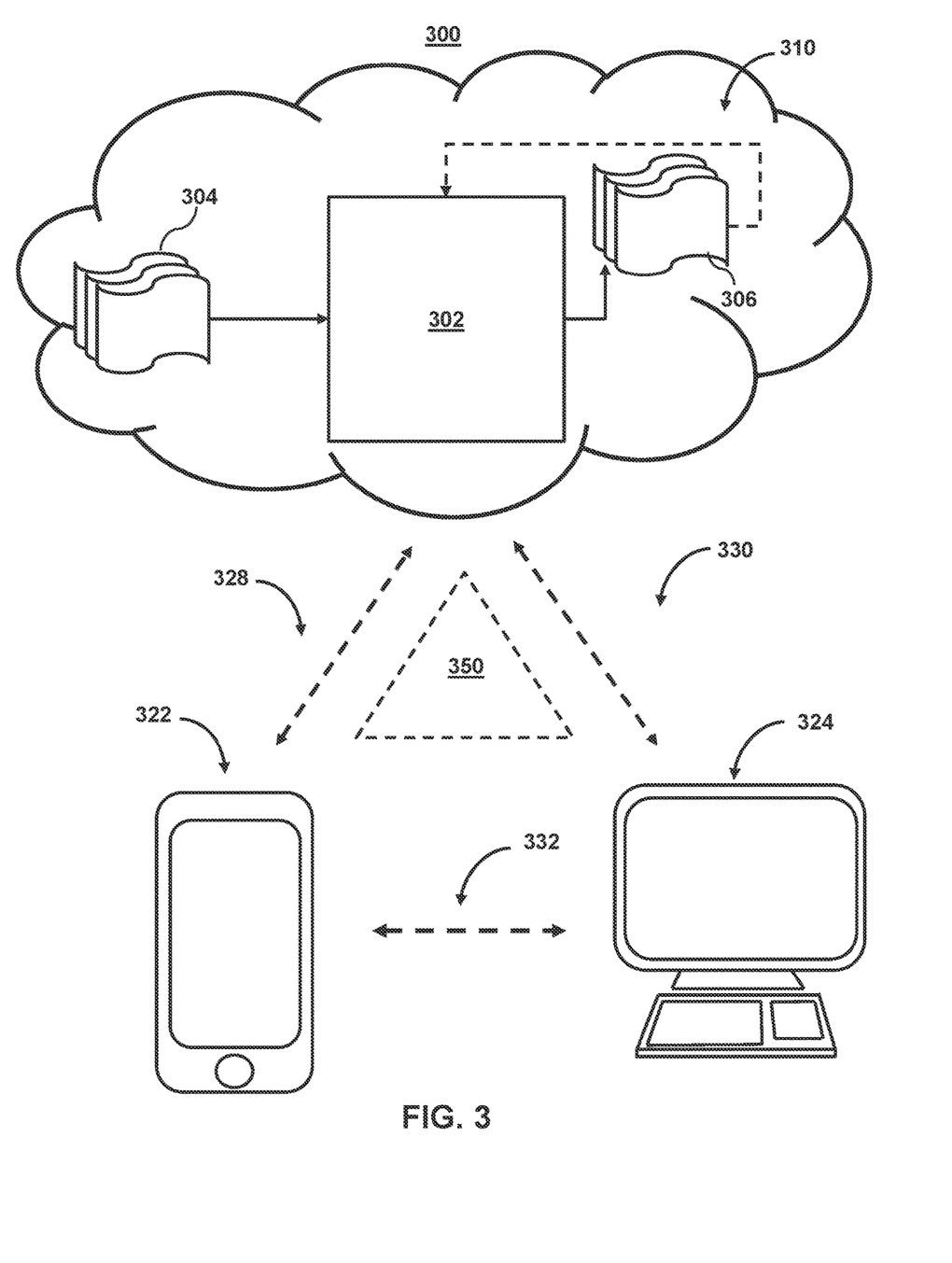
FIG. 3 is an illustrative pseudocode for presenting dynamic conversational queries, in accordance with one or more embodiments.

FIG. 3 shows illustrative system components for determining severity levels of disruptions in communication networks, in accordance with one or more embodiments. For example, system 300 may represent the components used for generating dynamic conversational responses, as shown in FIG. 1. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices. Users may, for instance, utilize one or more devices to interact with one another, one or more servers, or other components of system 300. It should be noted, that, while one or more operations are described herein as being performed by particular components of system 300, those operations may, in some embodiments, be performed by other components of system 300. As an example, while one or more operations are described herein as being performed by components of mobile device 322, those operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interface nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may be a database configured to store user data for a user. For example, the database may include user data that the system has collected about the user through prior interactions, both actively and passively. For example, the user data may describe one or more characteristics of a user, a user device, and/or one or more interactions of the user with a user device and/or application generating responses, queries, and/or notifications. Alternatively, or additionally, the system may act as a clearing house for multiple sources of information about the user. This information may be compiled into a user profile. Cloud components 310 may also include control circuitry configured to perform the various operations needed to generate alternative content. For example, the cloud components 310 may include cloud-based storage circuitry configured to generate alternative content. Cloud components 310 may also include cloud-based control circuitry configured to run processes to determine alternative content. Cloud components 310 may also include cloud-based input/output circuitry configured to display alternative content.

Cloud components 310 may include model 302, which may be a machine learning model (e.g., as described in FIG. 3). Model 302 may take inputs 304 and provide outputs 306. The inputs may include multiple datasets, such as a training dataset and a test dataset. Each of the plurality of datasets (e.g., inputs 304) may include data subsets related to user data, predicted intents, and/or actual intents. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction.

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., a user-generated data entry, word, severity level, etc.).

In some embodiments, model 302 may predict alternative content. For example, the system may determine that particular characteristics are more likely to be indicative of a prediction. In some embodiments, the model (e.g., model 302) may automatically perform actions based on outputs 306. In some embodiments, the model (e.g., model 302) may not perform any actions. The output of the model (e.g., model 302) may be used to generate for display, on a user interface, a recommendation based on the severity level.

System 300 also includes API layer 350. API layer 350 may allow the system to generate recommendations across different devices. In some embodiments, API layer 350 may be implemented on user device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside, in this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use strong security constraints applying WAF and DDoS protection, and API layer 350 may use RESTful APIs as standard for external integration.

Figure 4:
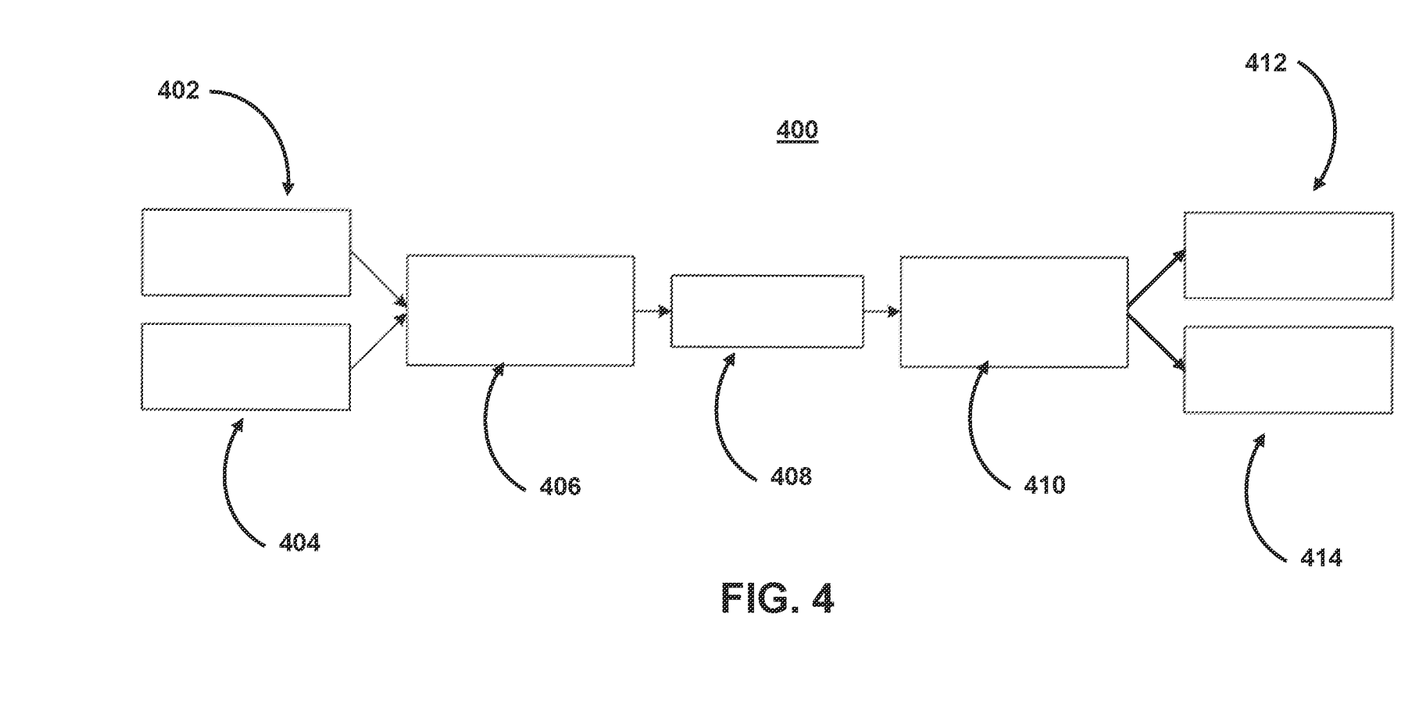
FIG. 4 is an illustrative system architecture for generating an embedding of a collection of user record data, in accordance with one or more embodiments.

FIG. 4 is an illustrative system architecture for generating an embedding of a collection of user record data, in accordance with one or more embodiments. For example, encoder 400 may process credit card transaction ("CCT") data, although other types of data may also be processed. For example, the embedding may be generated by a tabular autoencoder trained with mixed-type weighted loss function and a set of individual data components selected by predictive importance using an eXtreme gradient boosting algorithm. For example, eXtreme gradient boosting (XGBoost) is an open-source library that provides an efficient and effective implementation of the gradient boosting algorithm. In some embodiments, the embedding is generated by a tabular autoencoder neural network (e.g., encoder 400) that receives a first input type (e.g., input 402) and a second input type (e.g., input 404). For example, the first input type comprises continuous user record data, wherein the continuous user record data may take any value, and wherein the second input type comprises categorical user record data, wherein the categorical user record data. For example, categorical variables may contain a finite number of categories or distinct groups. Categorical data might not have a logical order. Continuous variables may be numeric variables that have an infinite number of values between any two values. Inputs 402 and 404 may be fed into encoder 406.

Encoder 406 may include embedding layers for input and output. For example, encoder 406 may comprise a neural network of fully connected encoding layers. Additionally, the weights of the input and output embedding layers may be tied so that the representation used by an item when encoding the sequence is the same as the one used in prediction. Encoder 406 may also include residual connections between all layers, and kernel size and dilation may be specified separately for each stacked convolutional layer. Encoder 406 may be trained using implicit feedback losses, including pointwise (logistic and hinge) and pairwise (BPR as well as WARP-like adaptive hinge) losses. The loss may be computed for all the time steps of a sequence in one pass.

Encoder 406 outputs a latent representation (e.g., embedding 408). For example, embedding 408 contains all the important information needed to represent the user record data (e.g., noise and/or unnecessary information is removed). For example, autoencoder 400 (e.g., via encoder 406) learns the data features of input 402 and input 404 and simplifies its representation to make it less processing intensive to analyze. For example, because autoencoder 400 is required to reconstruct the compressed data (e.g., embedding 408) using decoder 410, autoencoder 400 must learn to store all relevant information and disregard the noise.

Autoencoder 400 may generate embedding 408. Embedding 408 may then be input into decoder 410 in order to generate reconstructions of the input 402 and input 404. In some embodiments, decoder 410 may resemble the structure of encoder 406. For example, autoencoder 400 may comprise a stacked autoencoder such that the number of nodes per layer decreases with each subsequent layer of encoder 406 and increases back in decoder 414. Additionally or alternatively, decoder 410 may be symmetric to encoder 406 in terms of layer structure.

Decoder 410 may be trained on an unlabeled dataset as a supervised learning problem to output a reconstruction of the original input (e.g., output 412 and output 414). For example, decoder 410 may comprise a neural network of fully connected decoding layers. Autoencoder 400 may be trained by minimizing a reconstruction error, which measures the differences between the original input and the consequent reconstruction. For example, autoencoder 400 may evaluate the output by comparing the reconstructed time series data with the original time series data (or specific points, time periods, etc.), using a Mean Square Error ("MSE"). Accordingly, autoencoder 400 would determine the more similar the reconstructed time series data is with the original time series data, the smaller the reconstruction error.

For example, autoencoder 400 may input embedding 408 into decoder 410 of the autoencoder to generate a reconstruction of inputted time series data. For example, decoder 410 may be trained to generate reconstructions of inputted feature inputs. For example, the feature inputs may be vectors of values that correspond to input 402 and input 404 for one or more domains. In a practical example, embedding 408 may be a fund sequence that may be fed into decoder 410 to reconstruct the first collection of user record data for a plurality of users and for a plurality of domains. Decoder 410 may output a first output type (e.g., output 412) and a second output type (e.g., output 414). For example, the first output type comprises continuous user record data, wherein the continuous user record data may take any value, and wherein the second output type comprises categorical user record data, wherein the categorical user record data. For example, categorical variables may contain a finite number of categories or distinct groups. Categorical data might not have a logical order. Continuous variables may be numeric variables that have an infinite number of values between any two values.

Figure 5:
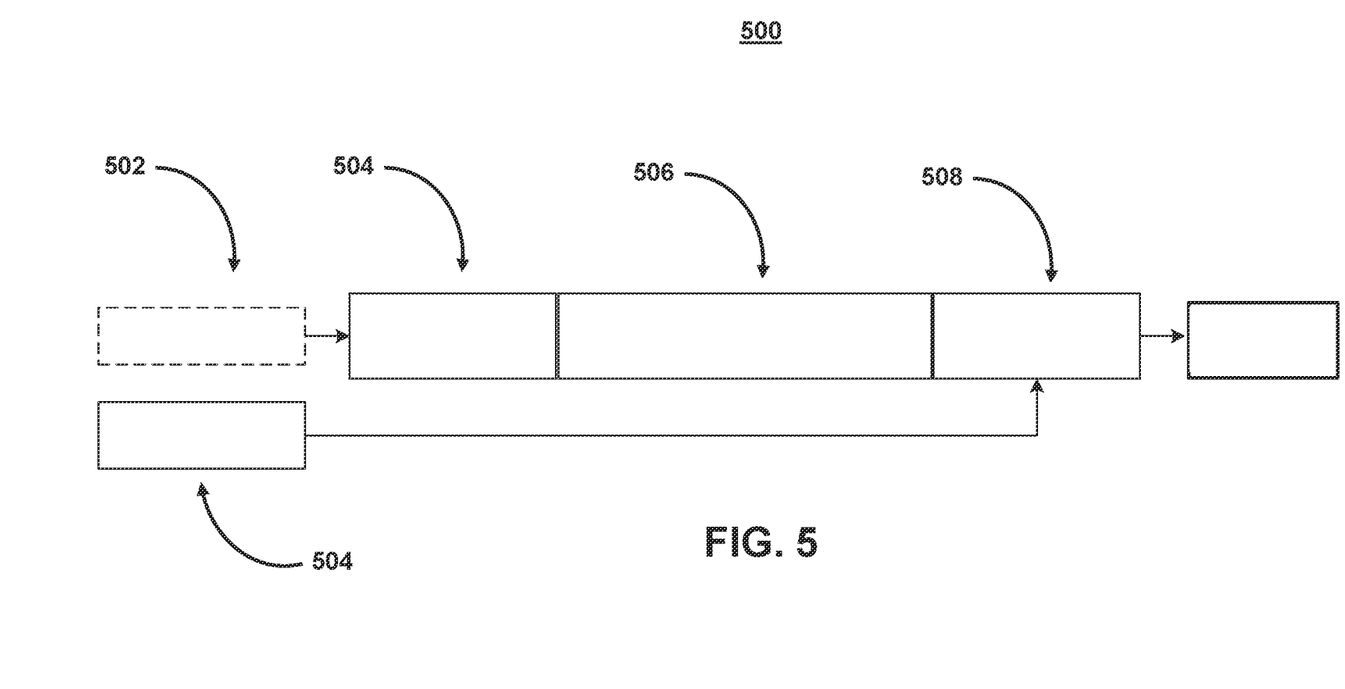
FIG. 5 is an illustrative system architecture for an artificial intelligence model predicting user intents, in accordance with one or more embodiments.

FIG. 5 is an illustrative system architecture for an artificial intelligence model predicting user intents, in accordance with one or more embodiments. For example, FIG. 5 shows model 500, which includes input 502 (e.g., corresponding to embedding 408 (FIG. 4)) and user record data that is passed through initial components of model 500.

Model 500 includes several components. Model 500 includes self-attention mechanism 504 (e.g., an embedding vector self-attention mechanism). For example, input 502 (e.g., which may comprise embedding 408) is processed by an attention mechanism relating different positions of a single sequence in order to compute a representation of the single sequence to generate the first feature input. For example, the system may use self-attention mechanisms to draw global dependencies between inputs and outputs. That is, the self-attention mechanism allows the inputs to interact with each other and determines which inputs should be paid more attention. The outputs are aggregates of these interactions and attention scores. The system may use the self-attention mechanism to determine the one or more fields of data in user record data that has the highest probability to represent the intent of the user.

Model 500 includes a convolutional neural network 506 (e.g., an embedding vector convolutional neural network). For example, convolutional neural network 506 is a deep learning algorithm which can take in an image, assign importance (learnable weights and biases) to various aspects/objects in the input and be able to differentiate one from the other. The pre-processing required in the convolutional neural network is much lower as compared to other classification algorithms. While in primitive methods filters are hand-engineered, with enough training, the convolutional neural network can learn these filters/characteristics. The system may use the convolutional neural network to determine the one or more fields of data in user record data that has the highest probability to represent the intent of the user. Additionally, in some embodiments, the embedding is processed in the convolutional neural network as a single unit of information, instead of individual columns as is convention in convolutional neural networks. Processing the embedding as a single unit of information provides higher precision with intent prediction.

For example, model 508 comprises a fully connected neural network (e.g., network 508) that is trained to predict user intent based on a first feature input (e.g., input 502) and a second feature input (e.g., input 504). For example, a fully connected neural networks (FCNNs) are a type of artificial neural network where the architecture is such that all the nodes, or neurons, in one layer are connected to the neurons in the next layer. The first feature input is based on an embedding of a first collection of user record data for a plurality of users and for a plurality of domains (e.g., CCT data). The second feature input is based on a subset of the first collection comprising a group of domains selected from the plurality of domains (e.g., CCT passthrough data). In some embodiments, the group of domains are selected from the plurality of domains using eXtreme gradient boosting feature importance estimations and/or manual selection. Model 500 may then output labels (e.g., labels 510).

Figure 6:
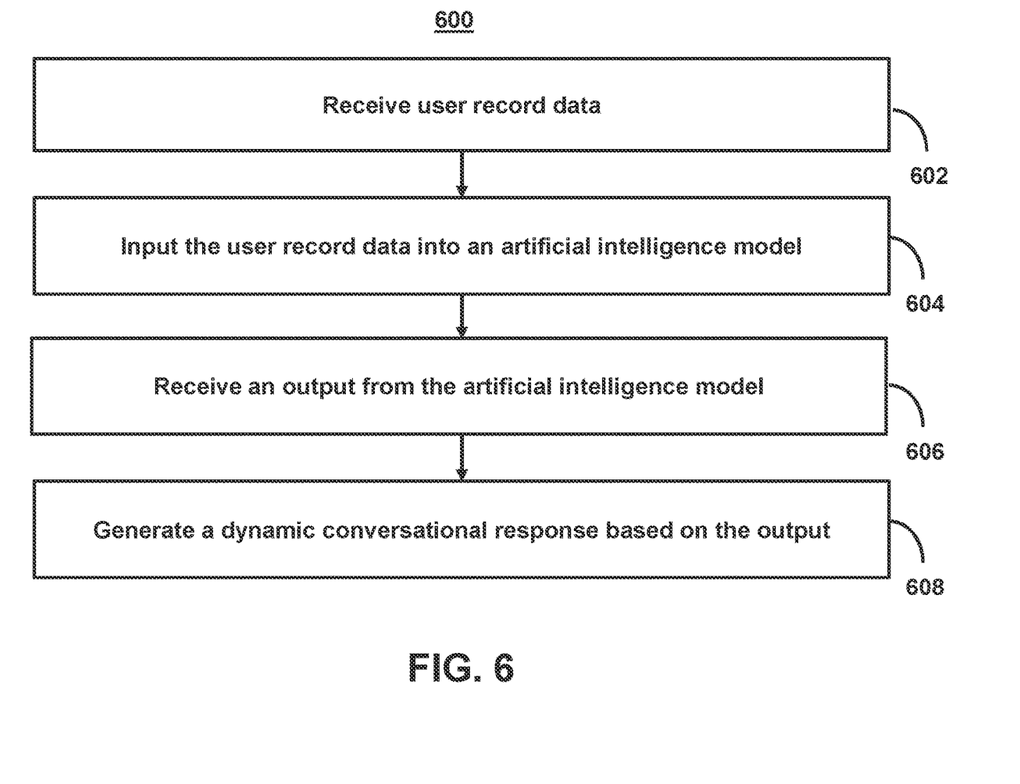
FIG. 6 shows a flowchart of the steps involved in user interface for presenting dynamic conversational queries, in accordance with one or more embodiments.

FIG. 6 shows a flowchart of the steps involved in user interface for presenting dynamic conversational queries, in accordance with one or more embodiments. For example, the system may use process 600 (e.g., as implemented on one or more system components) in order to generate dynamic conversational responses. For example, the system may generate dynamic conversational responses based on predicted user intents using artificial intelligence models that compensate for training data featuring a high proportion of missing data points. For example, the system uses an initial autoencoder to create a latent representation (e.g., embedding) or known transaction data in order to compensate for missing data points in the known transaction data. The system solves the technical problem of compensating for missing data points in the known transaction data. The solution to this technical problem may involve generating an embedding of the first collection of user record data (e.g., known transaction data). Solving this technical problem provides the practical benefit of creating additional training data that is not negatively impacted from missing data points.

At step 602, process 600 (e.g., using one or more components described in system 300 (FIG. 3)) receives user record data. For example, the system may receive first user record data. In some embodiments, the system may generate a user feature input based on the first user record data, wherein the user feature input comprises a vectorized representation of the plurality of fields related to the electronic communication.

At step 604, process 600 (e.g., using one or more components described in system 300 (FIG. 3)) input the user record data into an artificial intelligence model. For example, the system may input the first user record data into an artificial intelligence model, wherein the artificial intelligence model comprises a neural network that is trained to predict user intent based on a first feature input and a second feature input, wherein the first feature input is based on an embedding of a first collection of user record data for a plurality of users and for a plurality of domains, and wherein the second feature input is based on a subset of the first collection comprising a group of domains selected from the plurality of domains. In some embodiments, the group of domains are selected from the plurality of domains using eXtreme gradient boosting feature importance estimations and/or manual selection.

In some embodiments, the embedding is processed by an attention mechanism relating different positions of a single sequence in order to compute a representation of the single sequence to generate the first feature input. For example, the system may use self-attention mechanisms to draw global dependencies between inputs and outputs. That is, the system the self-attention mechanism allows the inputs to interact with each other and determines which inputs should be paid more attention. The outputs are aggregates of these interactions and attention scores. The system may use the self-attention mechanism to determine the one or more fields of data in user record data that has the highest probability to represent the intent of the user.

Additionally or alternatively, the embedding is processed by a convolutional neural network to generate the first feature input. A convolutional neural network is a deep learning algorithm which can take in an image, assign importance (learnable weights and biases) to various aspects/objects in the input and be able to differentiate one from the other. The pre-processing required in the convolutional neural network is much lower as compared to other classification algorithms. While in primitive methods filters are hand-engineered, with enough training, the convolutional neural network has the ability to learn these filters/characteristics. The system may use the convolutional neural network to determine the one or more fields of data in user record data that has the highest probability to represent the intent of the user. Additionally, in some embodiments, the embedding is processed in the convolutional neural network as a single unit of information, instead of individual columns as is convention in convolutional neural network. Processing the embedding as a single unit of information provides higher precision with intent prediction.

Additionally or alternatively, the embedding is generated by a tabular autoencoder trained with mixed-type weighted loss function and a set of individual data components selected by predictive importance using an eXtreme gradient boosting algorithm. For example, eXtreme gradient boosting (XGBoost) is an open-source library that provides an efficient and effective implementation of the gradient boosting algorithm. In some embodiments, the embedding is generated by a tabular autoencoder neural network that receives a first input type and a second input type, wherein the first input type comprises continuous user record data, wherein the continuous user record data may take any value, and wherein the second input type comprises categorical user record data, wherein the categorical user record data. For example, categorical variables may contain a finite number of categories or distinct groups. Categorical data might not have a logical order. Continuous variables may be numeric variables that have an infinite number of values between any two values.

In some embodiments, the tabular autoencoder neural network is trained using a loss function that comprises a mean square error function for each feature of the first input type and a cross entropy loss function for each feature of the second input type. For example, a loss function is the function that computes the distance between the current output of the algorithm and the expected output. The system may aim to minimize this loss function and may do so using different methods in order to increase prediction precision. For example, a cross-entropy loss function measures the difference between two averages of the number of bits of distribution of information. The mean square errors are the difference between the current output and the expected output divided by the number of outputs. Mean square error loss functions are very sensitive to outliers because the difference is a square that gives more importance to outliers.

At step 606, process 600 (e.g., using one or more components described in system 300 (FIG. 3)) receives an output from the artificial intelligence model. For example, the system may receive an output from the artificial intelligence model. For example, the output may comprise a vectorized representation of a predicted intent.

At step 608, process 600 (e.g., using one or more components described in system 300 (FIG. 3)) generates a dynamic conversational response based on the output. For example, the system may generate for display, in a user interface, a dynamic conversational response based on the output.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to FIGS. 1-5 could be used to perform one or more of the steps in FIG. 6.

The above-described embodiments of the present disclosure are presented for purposes of illustration, and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for generating dynamic conversational responses based on predicted user intents using artificial intelligence models, the method comprising: receiving first user record data; inputting the first user record data into an artificial intelligence model, wherein the artificial intelligence model comprises a neural network that is trained to predict user intent based on a first feature input and a second feature input, wherein the first feature input is based on an embedding of a first collection of user record data for a plurality of users and for a plurality of domains, and wherein the second feature input is based on a subset of the first collection comprising a group of domains selected from the plurality of domains; receiving an output from the artificial intelligence model; and generating for display, in a user interface, a dynamic conversational response based on the output.

2. The method of any one of the preceding claims, wherein the embedding is processed by an attention mechanism relating different positions of a single sequence in order to compute a representation of the same sequence to generate the first feature input.

3. The method of any one of the preceding claims, wherein the embedding is processed by a convolutional neural network to generate the first feature input.

4. The method of any one of the preceding claims, wherein the embedding is generated by a tabular autoencoder neural network that receive a first input type and a second input type, wherein the first input type comprises continuous user record data, wherein the continuous user record data may take any value, and wherein the second input type comprises categorical user record data, wherein the categorical user record data.

5. The method of any one of the preceding claims, wherein the tabular autoencoder neural network is training using a loss function that comprises a mean square error function for each feature of the first input type and a cross entropy loss function for each feature of the second input type.

6. The method of any one of the preceding claims, wherein the loss function further determines a weighted average of a loss based on the mean square error function and the cross entropy loss function for each feature.

7. The method of any one of the preceding claims, wherein the embedding is processed in the convolutional neural network as a single unit of information.

8. The method of any one of the preceding claims, wherein the embedding is generated by a tabular autoencoder trained with mixed-type weighted loss function and a set of individual data components selected by predictive importance using an eXtreme gradient boosting algorithm.

9. The method of any one of the preceding claims, wherein the user record data comprises user transaction data.

10. The method of any one of the preceding claims, wherein the group of domains are selected from the plurality of domains using eXtreme gradient boosting feature importance estimations.

11. A tangible, non-transitory, machine-readable medium storing instructions that, when executed by a data processing apparatus, cause the data processing apparatus to perform operations comprising those of any of embodiments 1-10.

12. A system comprising: one or more processors; and memory storing instructions that, when executed by the processors, cause the processors to effectuate operations comprising those of any of embodiments 1-10.

13. A system comprising means for performing any of embodiments 1-10.

What is claimed is:

1. A system for generating dynamic conversational responses based on predicted user intents using artificial intelligence models that compensate for training data featuring a high proportion of missing data points, the system comprising:
    cloud-based storage circuitry configured to store an artificial intelligence model, wherein the artificial intelligence model comprises a neural network that is trained to predict user intent based on a first feature input and a second feature input, wherein the first feature input is based on an embedding of a first collection of user record data for a plurality of users and for a plurality of domains, and wherein the second feature input is based on a subset of the first collection comprising a group of domains selected from the plurality of domains;
    cloud-based control circuitry configured to:
        receive first user record data, wherein the first user record data comprises user transaction data comprising a plurality of fields related to an electronic communication of a user;
        generate a user feature input based on the first user record data, wherein the user feature input comprises a vectorized representation of the plurality of fields related to the electronic communication;
        input the user feature input into the artificial intelligence model;
        receive an output from the artificial intelligence model, wherein the output corresponds to a predicted intent of the user; and
    cloud-based input/output circuitry configured to generate for display, on a user interface, a dynamic conversational response based on the output, wherein the dynamic conversational response comprises a text-string message based on the predicted intent of the user.

2. A method for generating dynamic conversational responses based on predicted user intents using artificial intelligence models, the method comprising:
    receiving first user record data;
    inputting the first user record data into an artificial intelligence model, wherein the artificial intelligence model comprises a neural network that is trained to predict user intent based on a first feature input and a second feature input, wherein the first feature input is based on an embedding of a first collection of user record data for a plurality of users and for a plurality of domains, and wherein the second feature input is based on a subset of the first collection comprising a group of domains selected from the plurality of domains;
    receiving an output from the artificial intelligence model; and
    generating for display, in a user interface, a dynamic conversational response based on the output.

3. The method of claim 2, wherein the embedding is processed by an attention mechanism relating different positions of a single sequence in order to compute a representation of the single sequence to generate the first feature input.

4. The method of claim 2, wherein the embedding is processed by a convolutional neural network to generate the first feature input.

5. The method of claim 2, wherein the embedding is generated by a tabular autoencoder neural network that receives a first input type and a second input type, wherein the first input type comprises continuous user record data, wherein the continuous user record data may take any value, and wherein the second input type comprises categorical user record data, wherein the categorical user record data.

6. The method of claim 5, wherein the tabular autoencoder neural network is training using a loss function that comprises a mean square error function for each feature of the first input type and a cross-entropy loss function for each feature of the second input type.

7. The method of claim 6, wherein the loss function further determines a weighted average of a loss based on the mean square error function and the cross-entropy loss function for each feature.

8. The method of claim 2, wherein the embedding is processed in a convolutional neural network as a single unit of information.

9. The method of claim 2, wherein the embedding is generated by a tabular autoencoder trained with mixed-type weighted loss function and a set of individual data components selected by predictive importance using an eXtreme gradient boosting algorithm.

10. The method of claim 2, wherein the user record data comprises user transaction data.

11. The method of claim 2, wherein the group of domains are selected from the plurality of domains using eXtreme gradient boosting feature importance estimations.

12. A non-transitory, computer readable medium for generating dynamic conversational responses based on predicted user intents using artificial intelligence models comprising instructions that when executed by one or more processors, cause operations comprising:
    receiving first user record data;
    inputting the first user record data into an artificial intelligence model, wherein the artificial intelligence model comprises a neural network that is trained to predict user intent based on a first feature input and a second feature input, wherein the first feature input is based on an embedding of a first collection of user record data for a plurality of users and for a plurality of domains, and wherein the second feature input is based on a subset of the first collection comprising a group of domains selected from the plurality of domains;
    receiving an output from the artificial intelligence model; and
    generating for display, in a user interface, a dynamic conversational response based on the output.

13. The non-transitory, computer readable medium of claim 12, wherein the embedding is processed by an attention mechanism relating different positions of a single sequence in order to compute a representation of the single sequence to generate the first feature input.

14. The non-transitory, computer readable medium of claim 12, wherein the embedding is processed by a convolutional neural network to generate the first feature input.

15. The non-transitory, computer readable medium of claim 12, wherein the embedding is generated by a tabular autoencoder neural network that receives a first input type and a second input type, wherein the first input type comprises continuous user record data, wherein the continuous user record data may take any value, and wherein the second input type comprises categorical user record data, wherein the categorical user record data.

16. The non-transitory, computer readable medium of claim 15, wherein the tabular autoencoder neural network is training using a loss function that comprises a mean square error function for each feature of the first input type and a cross-entropy loss function for each feature of the second input type.

17. The non-transitory, computer readable medium of claim 16, wherein the loss function further determines a weighted average of a loss based on the mean square error function and the cross-entropy loss function for each feature.

18. The non-transitory, computer readable medium of claim 14, wherein the embedding is processed in the convolutional neural network as a single unit of information.

19. The non-transitory, computer readable medium of claim 12, wherein the embedding is generated by a tabular autoencoder trained with mixed-type weighted loss function and a set of individual data components selected by predictive importance using an eXtreme gradient boosting algorithm.

20. The non-transitory, computer readable medium of claim 12, wherein the group of domains are selected from the plurality of domains using eXtreme gradient boosting feature importance estimations.

* * * * *